United States Patent
Wang

(10) Patent No.: US 10,880,381 B2
(45) Date of Patent: Dec. 29, 2020

(54) DIRECT CONNECTION LIMITATION BASED ON A PERIOD OF TIME

(71) Applicant: ENTIT SOFTWARE LLC, Sanford, NC (US)

(72) Inventor: Xiaoyi Wang, Sunnyvale, CA (US)

(73) Assignee: MICRO FOCUS LLC, Santa Clara, CA (US)

( * ) Notice: Subject to any disclaimer, the term of this patent is extended or adjusted under 35 U.S.C. 154(b) by 171 days.

(21) Appl. No.: 15/773,010

(22) PCT Filed: Nov. 4, 2015

(86) PCT No.: PCT/US2015/058987
§ 371 (c)(1),
(2) Date: May 2, 2018

(87) PCT Pub. No.: WO2017/078696
PCT Pub. Date: May 11, 2017

(65) Prior Publication Data
US 2018/0324258 A1    Nov. 8, 2018

(51) Int. Cl.
*G06F 15/16*   (2006.01)
*H04L 29/08*   (2006.01)
*H04L 9/08*    (2006.01)
*H04L 12/851*  (2013.01)

(52) U.S. Cl.
CPC .......... *H04L 67/141* (2013.01); *H04L 9/088* (2013.01); *H04L 67/101* (2013.01); *H04L 67/143* (2013.01); *H04L 47/24* (2013.01)

(58) Field of Classification Search
CPC ..... H04L 47/24; H04L 67/101; H04L 67/141; H04L 67/143; H04L 9/088; H04L 67/1004; G06F 9/505
See application file for complete search history.

(56) References Cited

U.S. PATENT DOCUMENTS

| | | | |
|---|---|---|---|
| 7,636,917 B2 | 12/2009 | Darling et al. | |
| 7,908,355 B2 | 3/2011 | Chauffeur et al. | |
| 8,073,952 B2 | 12/2011 | Yoo et al. | |
| 8,625,803 B1 | 1/2014 | Radhakrishnan et al. | |
| 9,037,719 B2 | 5/2015 | Shen et al. | |

(Continued)

FOREIGN PATENT DOCUMENTS

| | | |
|---|---|---|
| CN | 102437960 A | 8/2014 |
| EP | 2916225 A1 | 9/2015 |

OTHER PUBLICATIONS

Mark Curphey, A Guide to Building Secure Web Applications, 2002, The Open Web Application Security Project (Year: 2002).*

(Continued)

*Primary Examiner* — Ryan J Jakovac

(57) ABSTRACT

Examples herein disclose a facilitation of a direct connection between a source and a destination. In response to a request from the source to facilitate the direct connection, the examples identify the destination among multiple destinations based on available bandwidth from the multiple destinations. The examples transmit a security token to the identified destination for authentication of traffic from the source, wherein the source includes an indication of a period of time. Based on the indication of the period of time, the examples limit the direct connection.

17 Claims, 6 Drawing Sheets

(56) References Cited

U.S. PATENT DOCUMENTS

| | | | |
|---|---|---|---|
| 9,179,009 B1* | 11/2015 | Subramanian | H04W 88/16 |
| 9,712,621 B1* | 7/2017 | Bowen | H04L 67/14 |
| 2003/0093560 A1 | 5/2003 | Ono et al. | |
| 2003/0195984 A1* | 10/2003 | Zisapel | G06F 9/505 |
| | | | 709/238 |
| 2004/0205190 A1* | 10/2004 | Chong | H04L 65/1043 |
| | | | 709/225 |
| 2010/0082804 A1* | 4/2010 | Patel | G06F 11/3419 |
| | | | 709/224 |
| 2011/0252238 A1* | 10/2011 | Abuan | H04L 61/2575 |
| | | | 713/168 |
| 2014/0047523 A1* | 2/2014 | Swerdlow | G06F 21/62 |
| | | | 726/7 |
| 2014/0258534 A1 | 9/2014 | Allrich et al. | |
| 2014/0359698 A1 | 12/2014 | Sorenson, III et al. | |
| 2015/0163161 A1* | 6/2015 | Arikatla | H04L 47/726 |
| | | | 709/226 |
| 2016/0191594 A1* | 6/2016 | Moustafa | H04L 65/4084 |
| | | | 709/203 |
| 2016/0254914 A1* | 9/2016 | Saito | H04L 9/088 |
| | | | 713/153 |
| 2016/0359872 A1* | 12/2016 | Yadav | H04L 43/04 |

OTHER PUBLICATIONS

Uppal, H., et al., OpenFlow Based Load Balancing, Jun. 5, 2010, University of Washington, CSE561: Networking Project Report, 7 pages.

International Searching Authority., International Search Report and Written Opinion dated Aug. 1, 2016 for PCT Application No. PCT/US2015/058987 Filed Nov. 4, 2015, 14 pgs.

* cited by examiner

DIRECT CONNECTION LIMITATION BASED ON A PERIOD OF TIME

BACKGROUND

In network load balancing, a networking component may balance traffic across multiple links. Balancing traffic across the multiple links gives the networking component the ability to spread out an amount of the bandwidth for processing network traffic.

BRIEF DESCRIPTION OF THE DRAWINGS

In the accompanying drawings, like numerals refer to like components or blocks. The following detailed description references the drawings, wherein.

DETAILED DESCRIPTION

In a networking system, a load balancer serves as a centralized topology where the load balancer performs load balancing across multiple destinations. As used herein, the term "load balancing" refers to the distribution of the network traffic (e.g., packets) among multiple destinations (e.g., computing devices). To implement the load balancing operation, upon arrival of the traffic, a networking device performs a round robin to distribute the traffic out accordingly. In this example, the networking device serves as the centralized topology to receive traffic and then distribute. However, the networking device may become a bottleneck of the networking system if the load balancer handles too much traffic at a given period of time. This may cause packet loss and networking system slow down. Forming a continuous direct connection between a source and destination may be ineffective as traffic patterns vary over time and the continuous direct connection may be more susceptible to security attacks.

To address these issues, examples disclosed herein provide an efficient mechanism to the aforementioned load balancing. The examples disclose a networking device to perform load balancing without the arrival of traffic to the networking device. The networking device implements the load balancing through an establishment and facilitation of a direct connection between a source and a destination. The networking device receives a connection request from the source and identifies the destination from multiple destinations based on available bandwidth. Identifying the destination based on the available bandwidth allows the networking device to balance traffic across those destinations which have the capability to support the traffic. Balancing the traffic based on the available bandwidth at the destinations, prevents traffic loss.

Additionally, the networking device establishes and facilitates the direct connection based on a transmission of first and second key pairs. Transmitting the first and the second key pairs to the source and identified destinations provides a security function to authenticate the source to the identified destination. Based on the first and the second key pairs, the source and the destination form an exclusive direct connection to transmit traffic. Authenticating the source to establish the direct connection ensures a secure connection exclusively between the source and the identified destination.

In another example, the networking device limits the direct connection based on a period of time. Limiting the direct connection in accordance to the period of time is an effective approach which rebalances traffic patterns over time.

Figure 1:
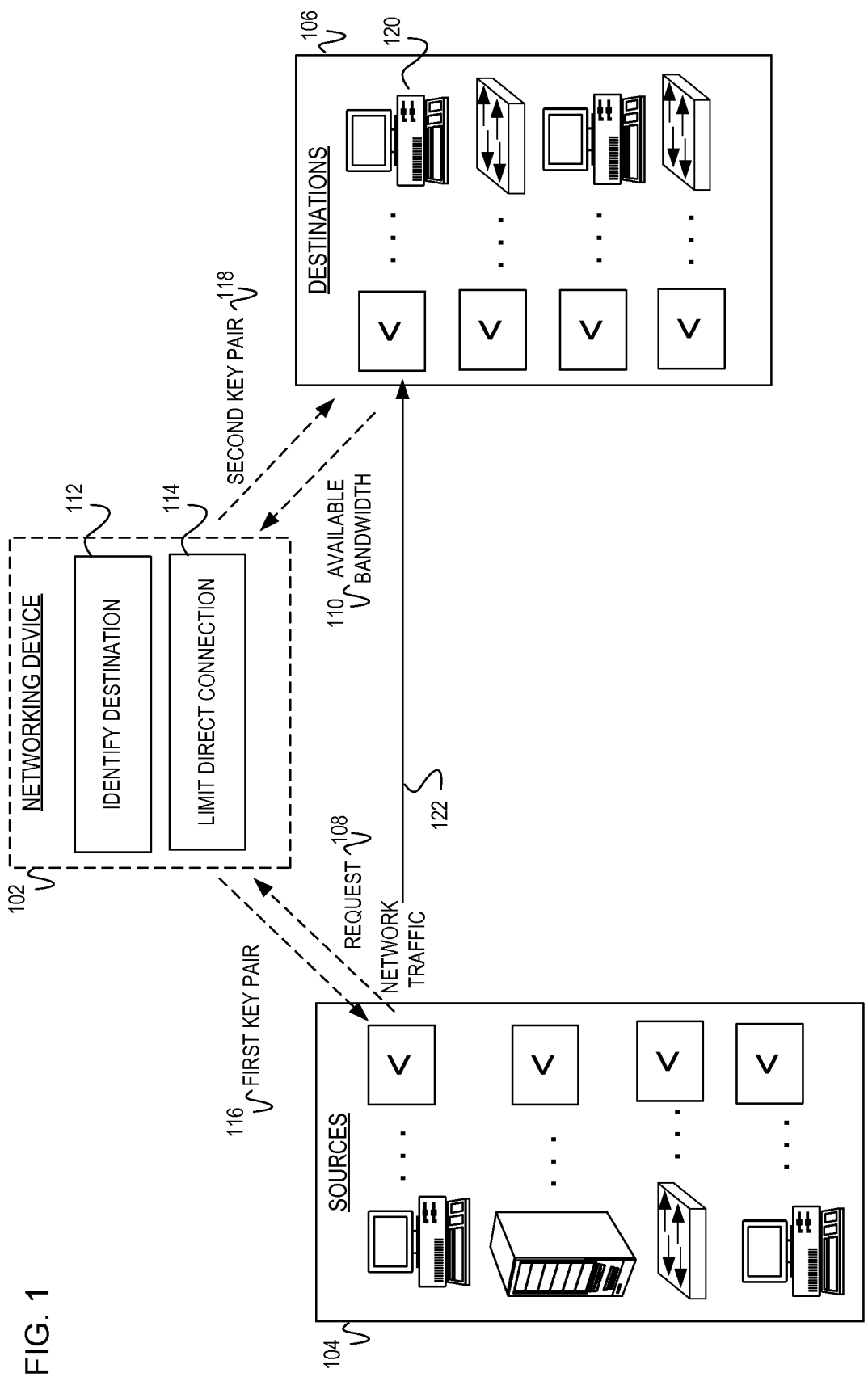
FIG. 1 is a block diagram of an example system including a networking device to identify a destination in response to a request from a source, the networking device transmits key pairs to the source and identified destination to limit a direct connection.

FIG. 1 is a block diagram of an example system including a networking device 102 to identify a destination 120 among multiple destinations 106 in response to a request 108 from a source 104. The networking device 102 identifies the destination 120 based on available bandwidth from the multiple destinations 106 at module 112. In response to identifying the destination 120, the networking device 102 transmits a first key pair 116 to the source 104 and a second key pair 118 to the identified destination 120. The first and the second key pairs 116 and 118 indicate a period of time. The networking device 102 limits a direct connection 120 between the source 104 and the identified destination 120 in accordance with the indicated period of time at module 114. The direct connection 120 is considered a link formed between the source 104 and the identified destination 120 so that network traffic is transmitted over this link. The system in FIG. 1 represents a load balancing network system. The load balancing network system is a system in which the networking device 102 is capable of facilitating direct connections between the sources and the destinations 106 such that networking traffic is distributed among the direct connections. As such, implementations of the system include a domain name system (DNS) network, wide area network, legacy network, local area network (LAN), Ethernet, optic cable network, software defined network (SDN), or other type of networking system capable of balancing network traffic through the formation of the direct connections. Although FIG. 1 illustrates the system with components 102, 104, and 106 implementations should not be limited as the system may include additional components such as an additional networking device, etc.

The networking device 102 is a component within the system capable of balancing network traffic through the facilitation of direction connections between the source(s) 104 and the multiple destinations 106. Implementations of the networking device 102 include, by way of example, a router, switch, server, networking switch, virtual networking component, mobile device, computing device, or other type of networking component capable of facilitating direct connections for the transmission of network traffic.

The source 104 is a computing component which receives network traffic and in turn transmits the request 108 for facilitation of the direct connection 122. Each source 104 may additionally include a connector (as indicated to the right of each source 104) to provide an interface between the component and the networking system. Depictions of the source(s) 104 are meant for illustrative purposes and note meant for limiting the technology. For example, the source 104 may include a different component such as a router, server, a networking system, or other networking component.

From among the multiple destinations 106, the networking device 102 identifies the destination 120. The identified destination 120 is determined in response to the networking device 102 receiving the request 108 from the source 104. The identified destination is determined based on the available bandwidth 110 from each of the destinations 106. Each of the multiple destinations 106 include a connector in which to interface to the networking system. Depictions of the identified destination 106 are meant for illustrative purposes and note meant for limiting the technology. For example, the identified destination 106 may include a router, computing device, switch, server, networking appliance, networking system, other networking component.

The request 108 is a data signal from the source 104 to the networking device 102 to facilitate the direct connection 122. In one implementation, the request 108 may define the network traffic as a number of events or processes over a period of time at the source 104. The number of events or processes occurring at the source 104 over the period of time, allows the networking device 102 to determine the amount of necessary bandwidth for processing the network traffic. For example, the request 108 may include events per second (EPS) information for the networking device 102 in turn to identify the destination 120.

The available bandwidth 110 is a bit-rate of available or free information capacity each of the multiple destinations 106 may be capable of accommodating. As such, each of the multiple destinations 106 may perform an analysis at their respective location to determine the available bandwidth. This available bandwidth is transmitted for the networking device 102 to track the bandwidth capability at each of the destinations 106. In one implementation, in addition to the available bandwidth, each destination 106 may also provide health information indicating the connectivity to the network. This implementation may be discussed in detail in later figures.

At modules 112-114, the networking device 102 determines the identified destination 120 and limits the direct connection 122 to the period of time. The networking device 102 uses the available bandwidth 110 as transmitted by the multiple destinations 106 to determine the identified destination 120 from the multiple destinations 106. Additionally, the networking device 102 limits the direct connection 122 by tracking the period of time. The modules 112-114 may include, by way of example, instructions (e.g., stored on a machine-readable medium) that, when executed (e.g., by the networking device 102), implement the functionality of modules 112-114. Alternatively, or in addition, the modules 112-114 may include electronic circuitry (i.e., hardware) that implements the functionality of modules 112-114.

The first and second key pairs 116 and 118 is a cryptographic security function in which to encrypt and decrypt information from the source 104. In this manner, the identified destination 120 authorizes the direct connection 122 to the source 104. For example, a public key may be used at the source 104 to encrypt data which is transmitted to the identified destination 120. The identified destination 120 receives the encrypted data and uses the private key transmitted in the second key pair 118 to decrypt the data. Thus based on this decrypted data, the identified destination 120 may authorize the direct connection 122 with the source 104. These key pairs 116 and 118 provide the security feature in prevent tampering or receiving traffic from an unauthorized source. As such, each key pair 116 and 118 may include a public key and a private key for encryption and decryption, accordingly. In one implementation, the first key pair 116 and the second key pair 118 are two different types of key pairs. For example, the first key pair 116 may be a symmetric key pair and the second key pair 118 may be an asymmetric key pair. In a further implementation, the networking device 102 may transmit a security token to the identified destination in place of the first and the second key pairs. The security token may include a security function in which the identified destination 120 may authorize or authenticate the transmission of network traffic from the source 104.

The direct connection 122 is considered a communication link enabled exclusively between the source 104 and the identified destination 120. This communication link 122 connects the source 104 and the identified destination 120 for the transmission of the network traffic from the source 104. The direct connection 122 is authorized based on the first and the second key pairs 116 and 118 transmitted by the networking device 102. The direct connection is limited in the sense that upon arrival of the network traffic, the identified destination 120 transmits an activation signal to the networking device 102 to track a countdown of the period of time. The period of time may be defined by an administrator or dynamically calculated based on the amount of necessary bandwidth to process network traffic. Upon the expiration of this period of time, the networking device 102 transmit a stop signal to the source 104 to cease the transmission of the networking traffic.

Figure 2:
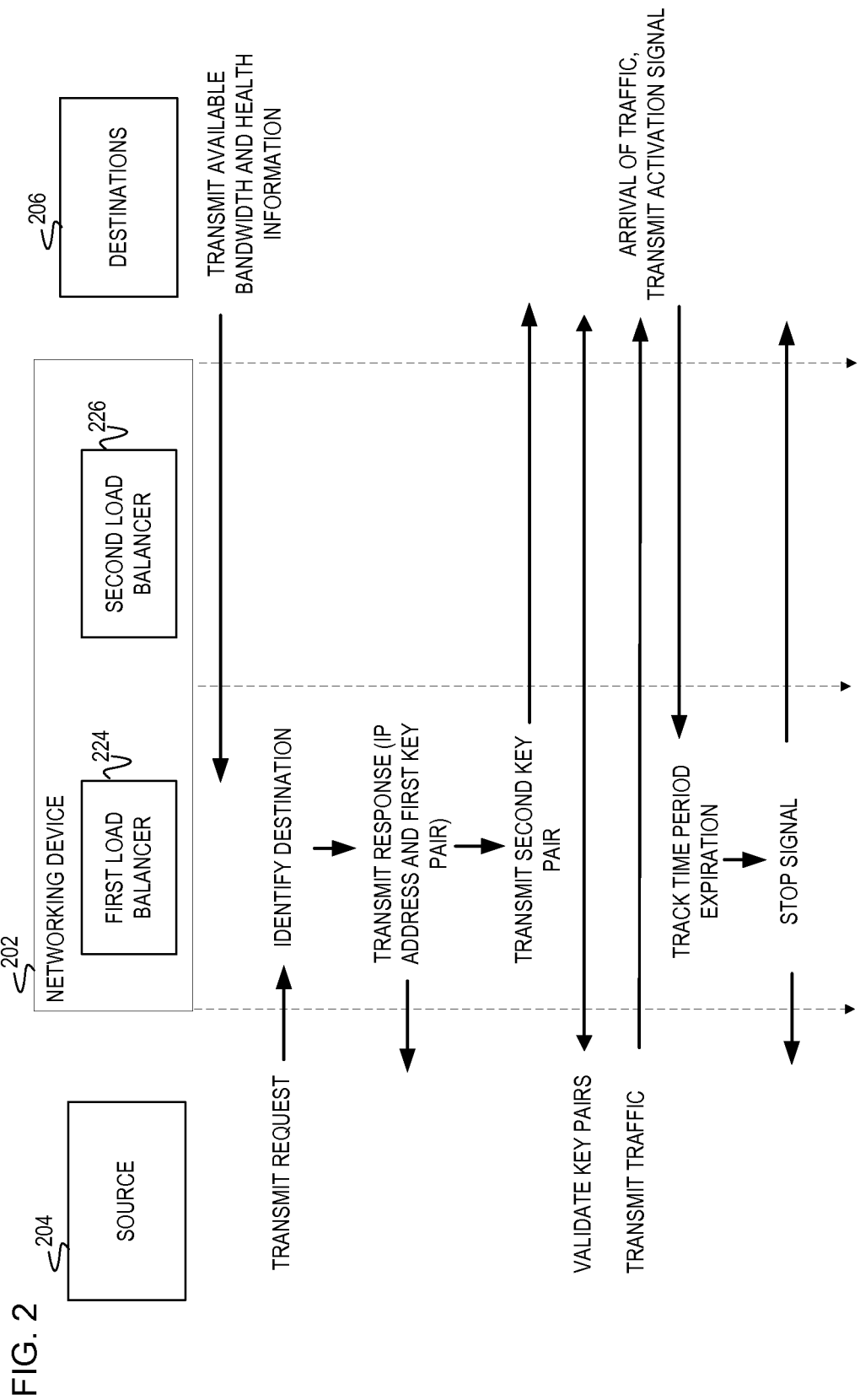
FIG. 2 is an illustration of example communications between a source, load balancers, and a destination.

FIG. 2 is an illustration of example communications between a networking device 202 to a source 204 and destination(s) 206 to facilitate a direct connection between the source 204 and an identified destination. Specifically, the networking device includes a first load balancer 224 to limit a period of time of the direct connection. A second load balancer 226 handles the facilitation of the direct connection should the first load balancer 224 become unavailable. As such, FIG. 2 illustrates the first load balancer 224 handling much of the task load and correspondence while the second load balancer 226 acts as more of a shadow of the first load balancer 224. Acting as more of shadow, ensures the load balancer 226 may pick up where the first load balancer 224 left off to handle the establishment of the direct connection and limitations thereof. The load balancer 224 and 226. Implementations of the load balancers 224 and 226 include by way of example, instructions executable by the networking device 202. Alternatively, or in combination, the load balancer 224 and 226 may include electronic circuitry or components.

The multiple destinations 206 transmit available bandwidth and health information continuously to the networking device 202. The health information is a heart beat signal indicating the health of each destination. Receiving the health information, the networking device 202 may accurately determine if a particular destination is offline. Thus, the networking device 202 may appropriately and accurately facilitate the establishment of the direct connection to source(s) and destinations(s).

The source 204 initiates the establishment of the direct connection through a transmission of a connection request to the networking device 202. The networking device 202 receives the connection request which is circulated to the first load balancer 224. The first load balancer 224 in response to the connection request, identifies the particular destination in which to form the direct connection. Upon identifying the destination, the first load balancer 224 transmits a response including a first key pair and an internet protocol (IP) address of the identified destination to the source 204. In addition to transmitting the first key pair, the first load balancer 224 transmits the second key pair to the identified destination. Transmitting these key pairs, the identified destination authenticates the traffic from the source 204. Upon validation of the key pairs to the source 204 and the identified destination, the establishment of the direct connection is formed. Upon forming the direct connection, the source 204 transmits traffic to the identified destination using the IP address sent in the response from the load balancer 224. Based on the arrival of the traffic from the source 204, the identified destination transmits an activation signal to the first load balancer 224. The activation signal indicates to the first load balancer 224 to track a period of time associated with the key pairs. The first load balancer 224 performs a count of the period of time to determine the expiration. Based on reaching the expiration of the period of time, the first load balancer 224 transmits a stop signal to both the source 204 and the identified destination to break or interrupt the direct connection.

Figure 3:
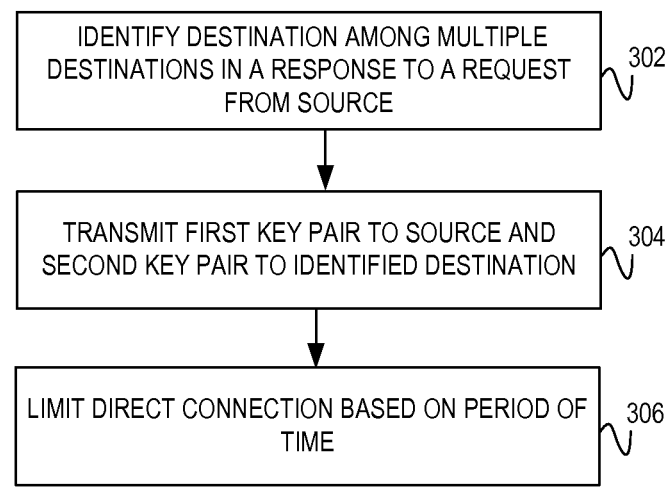
FIG. 3 is a flowchart of an example method executable by a networking device to limit a direct connection between a source and identified destination based on an indication of period of time in a key pair.

FIG. 3 is a flowchart of an example method to limit a direct connection between a source and an identified destination based on an indication of a period of time. The method is executable by a networking device to limit the direct connection. The networking device identifies a destination among multiple destinations in response to a request from a source. The request includes a communication to the networking device from the source to facilitate the direct connection. In an implementation, the request may include information on an amount of bandwidth corresponding to network traffic at the source. For example, the request may include a number of events per second which corresponds to the amount of the traffic at the source. The networking device utilizes this information to identify which destination may handle the network traffic. In another implementation, the networking device identifies the destination based on an amount of bandwidth available at each of the destinations. The amount of available bandwidth may correspond to the bandwidth information in the request to ensure the traffic is accurately balanced. Upon identifying the destination, the networking device transmits a first key pair to the source and a second key pair to the identified destination. The first and second key provides a security feature in the system through the authentication of the source and/or traffic from the source to the identified destination. Using the key pairs to authenticate the source to the identified destination, the direct connection may be set-up to allow the transmission of the traffic. The first and the second key pairs indicate the period of time in which to limit the direct connection. In discussing FIG. 3, references may be made to the components in FIGS. 1-2 to provide contextual examples. In one implementation, the networking device 102 executes operations 302-306 to facilitate and limit the direct connection. Although FIG. 3 is described as implemented by the networking device 102, it may be executable on other suitable components. For example, FIG. 3 may be implemented in the form of executable instructions on a machine-readable storage medium 504 and 604 as in FIGS. 5-6.

At operation 302 in response to receipt of the request by the source, the networking device identifies the destination. The destination is identified based on the amount of available bandwidth from multiple destinations. The amount of available bandwidth is the amount of bandwidth capacity usable at each of the destinations for processing network traffic. The networking device uses the request from the source that may include the necessary bandwidth for processing the network traffic. Based on the necessary bandwidth, the networking device determines which of the destinations has the available bandwidth to handle the network traffic.

At operation 304, upon identification of the destination, the networking device transmits the first key pair to the source and the second key pair to the identified destination. In one implementation, the second key pair indicates the period of time to limit the direct connection.

At operation 306, the networking device limits the direct connection in accordance with the indicated period of time. The direct connection may be limited according to the period of time which may be tracked by the identified destination or the networking device. In this implementation, the identified destination transmits an activation signal to the networking device upon the arrival of network traffic. Based on receiving the activation signal, the networking device tracks the period of time. Tracking the period of time, the networking device determines when the ending for the period of time occurs. This expiration of time signals to the networking device to transmit a stop signal to the source and the identified destination to cease the transmission of network traffic. The stop signal signifies to the source to cease transmission of the network traffic and to the identified destination to cease the acceptance of the traffic. If the transmission of the network traffic is incomplete, the source may transmit an additional request to the networking device for another direct connection.

Figure 4:
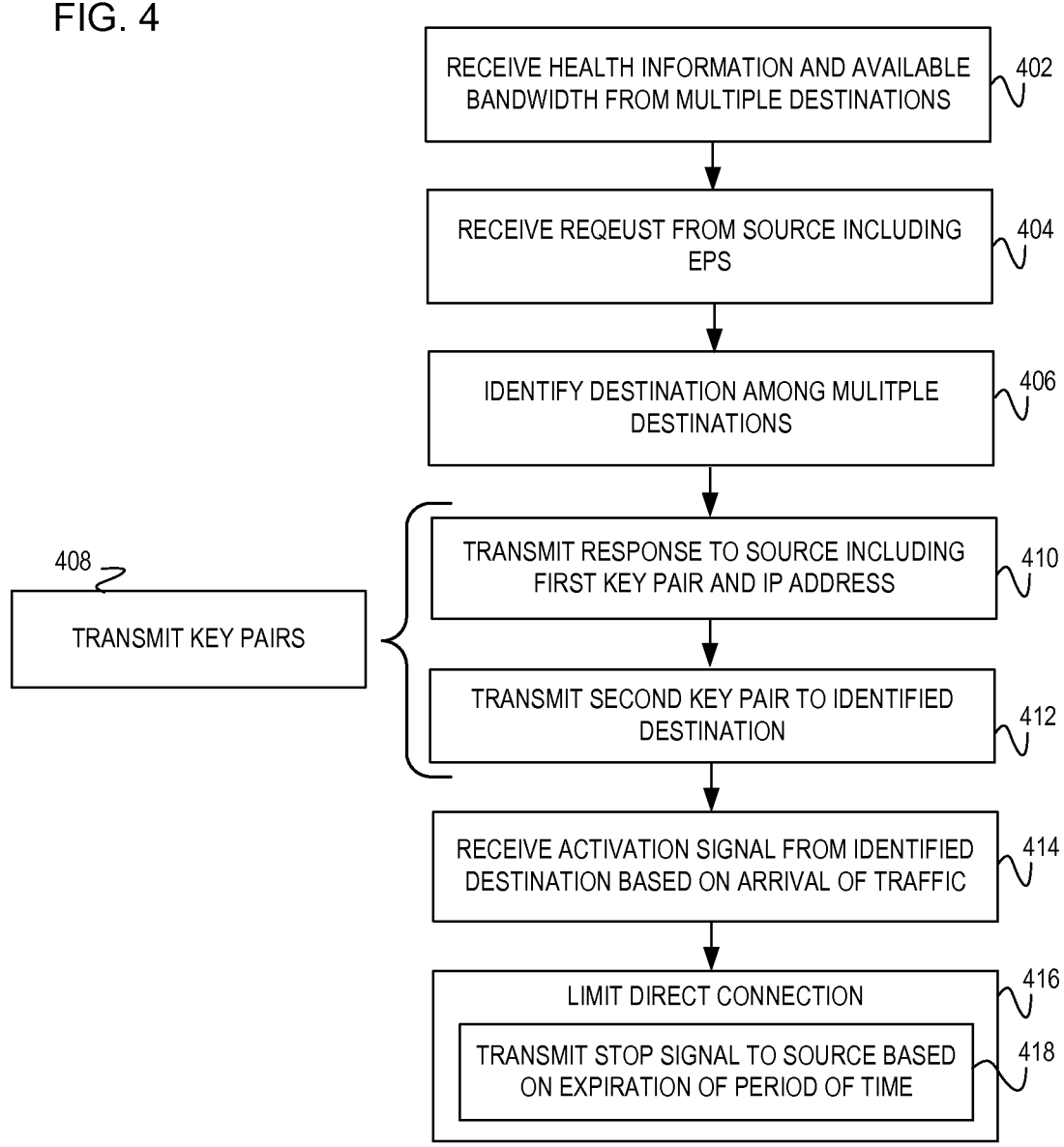
FIG. 4 is a flowchart of an example method executable by a networking device to limit a direct connection between a source and an identified destination via a transmission of a stop signal to the source based on an expiration of a period of time.

FIG. 4 is a flowchart of an example method to limit a direct connection via a transmission of a stop signal based on an expiration of a period of time. The method illustrated in FIG. 4 is executable by a networking device to limit the direct connection based on the expiration of the time period. The networking device receives from multiple destinations, health information and bandwidth available at each destination. In turn upon receive a request from a source to facilitate the direct connection, the networking device identifies the destination with which to initiate the direct connection from the source. The networking device identifies the destination among the multiple destinations based on the health information and available bandwidth. Upon identifying the destination, the networking device transmits a first key pair to the source and a second key pair to the identified destination. The key pairs are associated with a period of time, so when networking traffic arrives at the identified destination from the source, the networking device receives an activation signal. The activation signal indicates to the networking device to initiate a tracking of the period of time. Tracking the period of time, the networking device limits the direct connection by transmitting a stop signal to the source based on an expiration of the period of time. In discussing FIG. 4, references may be made to the components in FIGS. 1-2 to provide contextual examples. In one implementation, the networking device 102 executes operations 402-418 to facilitate and limit the direct connection. Although FIG. 4 is described as implemented by the networking device 102, it may be executable on other suitable components. For example, FIG. 4 may be implemented in the form of executable instructions on a machine-readable storage medium 504 and 604 as in FIGS. 5-6.

At operation 402, the networking device receives health information and available bandwidth from each of the destinations. The destinations may continuously transmit health information, such as heart beat signals to the networking device indicating the health of each destination. Along with the heart beat signals, the networking device receives the available bandwidth of each of the destinations, to appropriately facilitate direct connections and thus distribute the network traffic through the direct connections.

At operation 404, the networking device receives the connection request from the source. The connection request includes information identifying the source and the amount of necessary bandwidth to process network traffic. In implementations, the connection request defines a number of events/processes over a period of time corresponding to the network traffic at the source 104. For example, the request ma include the events per second (EPS) information for the networking device in turn to identify the destination.

At operation 406, in response to receive the connection request from the source, the networking device identifies the destination to form the direct connection based on the health information and available bandwidth. Operation 406 may be similar in functionality to operation 302 as in FIG. 2.

At operation 408 based on identifying the destination, the networking device transmits the first key pair to the source and the second key pair to the identified destination. In one implementation, the networking device transmits a response along with the first key pair to the source and the second key pair to the identified destination as at operations 410-412. Operation 408 may be similar in functionality to operation 304 as in FIG. 3.

At operation 410, the networking device transmits the first key pair and along with the response to the source. The first key pair may include an indication of the period of time in which to limit the direct connection. This allows the source to also track when the direct connection may expired based on the expiration of the period of time. Based on the identification of the destination, the networking device transmits the internet protocol (IP) address of the identified destination. This allows the source to direct the network traffic by encapsulating the traffic with the IP address to ensure the traffic is directed to the identified destination.

At operation 412, the networking device transmits the second key pair to the identified destination. The second key pair includes the indication of the period of time which instructs the identified destination to transmit the activation signal for counting the period of time. In addition to the second key pair, the networking device may also transmit a message to the identified destination to prepare for the oncoming traffic. In another implementation, in place of transmitted first and the second key pairs, the networking device transmits a security token to the identified destination for authentication of the source.

At operation 414, the networking device receives the activation signal upon the arrival of the traffic at the identified destination. The activation signal indicates to the networking device to initiate the count of the period of time to limit the direct connections. In this implementation, upon transmitting the activation signal, the direct connection is established.

At operation 416, the networking device limits the direct connection based on the expiration of the period of time. As such, operation 416 may be similar in functionality to operation 306 as in FIG. 3.

At operation 418, the networking device limits the direct connection by tracking when reaching the expiration of time. The expiration of time is a period of time which the networking device performs a count to determine when the end of time has been reached. Upon reaching the ending of this time period, the networking device proceeds to transmit the stop signal to the source and identified destination to cease the transmission of traffic over the direct connection.

Figure 5:
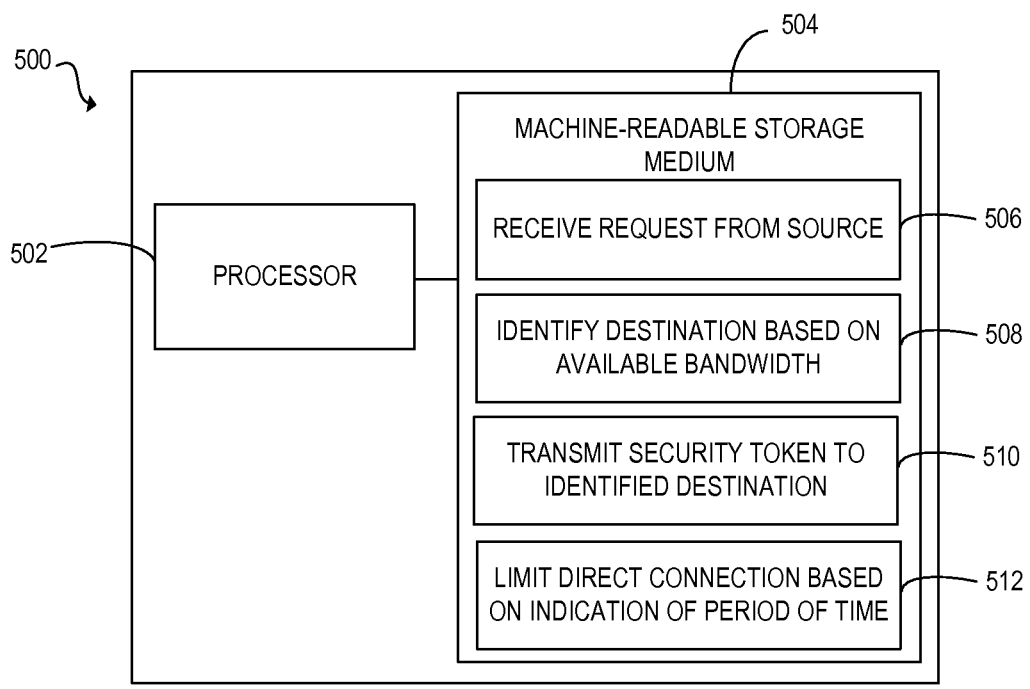
FIG. 5 is a block diagram of an example computing device with a processing resource to execute instructions in a machine-readable storage medium for limiting a direct connection based on a period of time.

FIG. 5 is a block diagram of computing device 500 with a processing resource 502 to execute instructions 506-512 within a machine-readable storage medium 504. Specifically, the computing device 500 with the processing resource 502 is to limit a direct connection between a source and an identified destination according to a period of time. Although the computing device 500 includes processing resource 502 and machine-readable storage medium 504, it may also include other components that would be suitable to one skilled in the art. For example, the computing device 500 may include a controller, memory storage, or other suitable type of component. The computing device 500 is an electronic device with the processing resource 502 capable of executing instructions 506-512 and as such embodiments of the computing device 500 include a networking device, server, switch, router, mobile device, desktop computer, laptop, or other type of electronic device capable of executing instructions 506-512. The instructions 506-512 may be implemented as methods, functions, operations, and other processes implemented as machine-readable instructions stored on the storage medium 504, which may be non-transitory, such as hardware storage devices (e.g., random access memory (RAM), read only memory (ROM), erasable programmable ROM, electrically erasable ROM, hard drives, and flash memory).

The processing resource 502 may fetch, decode, and execute instructions 506-512 to limit the direct connection between the source and identified destination based on a period of time. Specifically, the processing resource 502 executes instructions 506-512 to: receive a request from the source to facilitate the direct connection; in response to the request, identify the destination among multiple destinations based on the available bandwidth at each destination; upon identifying the destination, transmit the security token to the identified destination; and limit the direct connection based on a period of time.

The machine-readable storage medium 504 includes instructions 506-512 for the processing resource 502 to fetch, decode, and execute. In another embodiment, the machine-readable storage medium 504 may be an electronic, magnetic, optical, memory, storage, flash-drive, or other physical device that contains or stores executable instructions. Thus, the machine-readable storage medium 504 may include, for example, Random Access Memory (RAM), an Electrically Erasable Programmable Read-Only Memory (EEPROM), a storage drive, a memory cache, network storage, a Compact Disc Read Only Memory (CDROM) and the like. As such, the machine-readable storage medium 504 may include an application and/or firmware which can be utilized independently and/or in conjunction with the processing resource 502 to fetch, decode, and/or execute instructions of the machine-readable storage medium 504. The application and/or firmware may be stored on the machine-readable storage medium 504 and/or stored on another location of the computing device 500.

Figure 6:
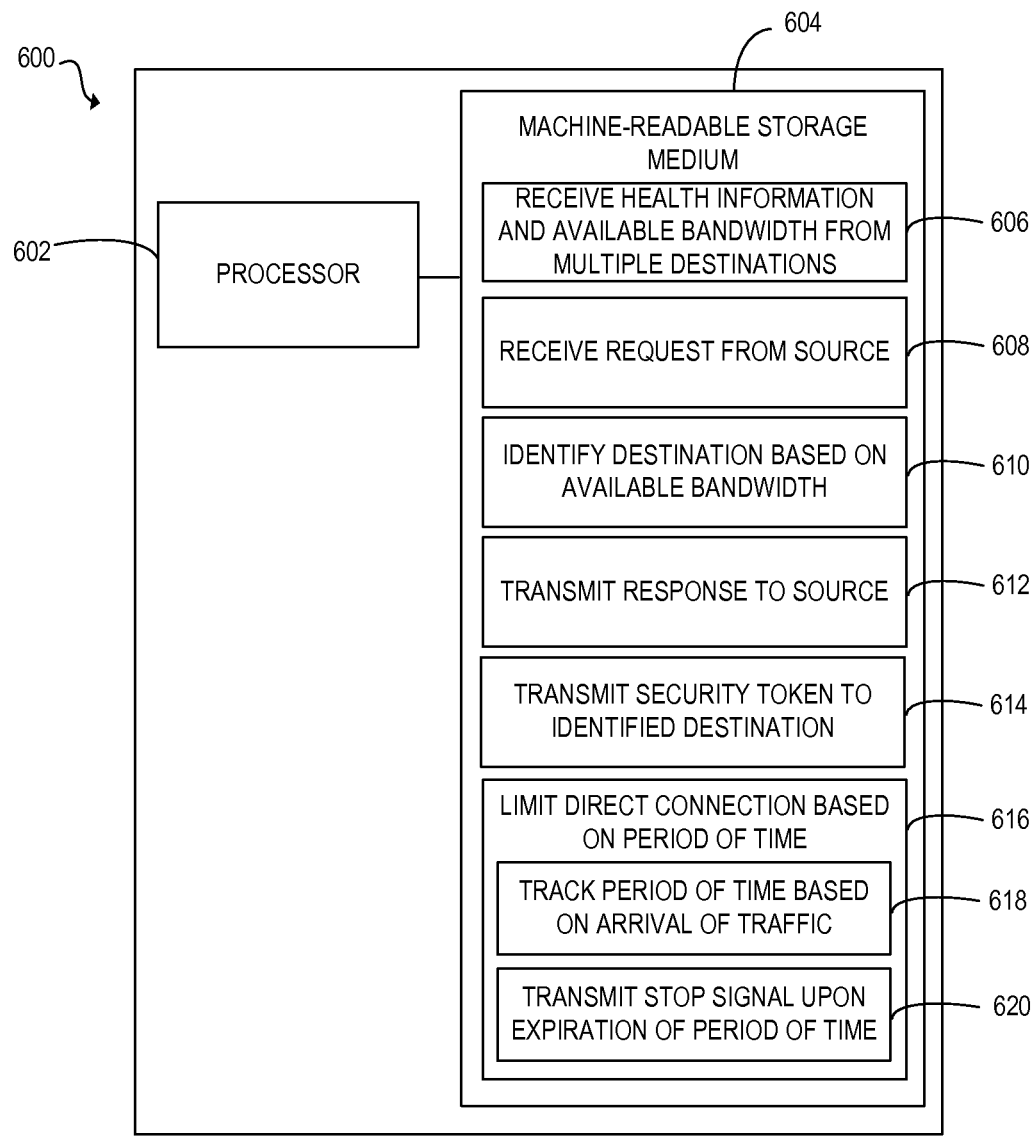
FIG. 6 is a block diagram of an example computing device with a processing resource to execute instructions in a machine-readable storage medium for limiting a direct connection between a source and an identified destination by tracking a period of time based on arrival of traffic to the identified destination.

FIG. 6 is a block diagram of computing device 600 with a processing resource 602 to execute instructions 606-620 within a machine-readable storage medium 604. Specifically, the computing device 600 with the processing resource 602 is to limit a direct connection between a source and an identified destination by tracking a period of time based on arrival of traffic to the identified destination. Although the computing device 600 includes processing resource 602 and machine-readable storage medium 604, it may also include other components that would be suitable to one skilled in the art. For example, the computing device 600 may include a controller, memory storage, or other suitable type of component. The computing device 600 is an electronic device with the processing resource 602 capable of executing instructions 606-620 and as such embodiments of the computing device 600 include a networking device, server, switch, router, mobile device, desktop computer, laptop, or other type of electronic device capable of executing instructions 606-620. The instructions 606-620 may be implemented as methods, functions, operations, and other processes implemented as machine-readable instructions stored on the storage medium 604, which may be non-transitory, such as hardware storage devices (e.g., random access memory (RAM), read only memory (ROM), erasable programmable ROM, electrically erasable ROM, hard drives, and flash memory).

The processing resource 602 may fetch, decode, and execute instructions 606-620 to limit the direct connection between the source and identified destination by tracking a period of time. Specifically, the processing resource 602 executes instructions 606-620 to: receive health information and available bandwidth from multiple destinations; receive a request from the source to facilitate the direct connection; in response to the request from the source, identify the destination among the multiple destinations according to an amount of bandwidth available at each of the destinations; upon identifying the destination, transmit a security token to the identified destination; limit the direct connection between the source and the identified destination through receiving an activation signal from the identified destination to start tracking the period of time; and upon expiration of the period of time, transmit the stop signal to the source and/or identified destination to stop the transmission of traffic to the identified destination.

The machine-readable storage medium 604 includes instructions 606-620 for the processing resource 602 to fetch, decode, and execute. In another embodiment, the machine-readable storage medium 604 may be an electronic, magnetic, optical, memory, storage, flash-drive, or other physical device that contains or stores executable instructions. Thus, the machine-readable storage medium 604 may include, for example, Random Access Memory (RAM), an Electrically Erasable Programmable Read-Only Memory (EEPROM), a storage drive, a memory cache, network storage, a Compact Disc Read Only Memory (CDROM) and the like. As such, the machine-readable storage medium 604 may include an application and/or firmware which can be utilized independently and/or in conjunction with the processing resource 602 to fetch, decode, and/or execute instructions of the machine-readable storage medium 604. The application and/or firmware may be stored on the machine-readable storage medium 604 and/or stored on another location of the computing device 600.

Although certain embodiments have been illustrated and described herein, it will be greatly appreciated by those of ordinary skill in the art that a wide variety of alternate and/or equivalent embodiments or implementations calculated to achieve the same purposes may be substituted for the embodiments shown and described without departing from the scope of this disclosure. Those with skill in the art will readily appreciate that embodiments may be implemented in a variety of ways. This application is intended to cover adaptions or variations of the embodiments discussed herein. Therefore, it is manifestly intended that embodiments be limited only by the claims and equivalents thereof.

I claim:

1. A method comprising:
   in response to a connection request from a source, identifying, by a processor of a networking device, a first destination from among multiple destinations based on available bandwidths of the multiple destinations;
   transmitting, by the processor of the networking device, a first security information to the source and a second security information to the first destination for authorizing a direct connection between the source and the first destination for a predetermined period of time, wherein the second security information transmitted to the first destination includes an indication of the predetermined period of time for the direct connection between the source and the first destination;
   receiving, by the processor of the networking device, a signal indicating an activation of the predetermined period of time from the first destination, wherein the signal indicating the activation of the predetermined period of time is sent to the networking device in responsive in response to an arrival of encrypted data from the source at the first destination;
   tracking, by the processor of the networking device, the predetermined period of time in association with the first security information and the second security information in response to receiving the signal indicating the activation of the predetermined period of time; and
   limiting, by the processor of the networking device, the direct connection between the source and the first destination based on the tracking of the predetermined period of time.

2. The method of claim 1, wherein the limiting of the direct connection between the source and the first destination comprises:
   transmitting, by the processor of the networking device, a stop signal to the source and the first destination in response to an expiration of the predetermined period of time, wherein the stop signal causes the source to cease transmitting the encrypted data to the first destination and causes the first destination to cease receiving the encrypted data from the source.

3. The method of claim 1, comprising:
   receiving, by the networking device, information of the available bandwidths of the multiple destinations from the multiple destinations.

4. The method of claim 1, comprising:
   responsive to the connection request from the source, transmitting, by the processor of the networking device, a response to the source, wherein the response includes the first security information and an Internet Protocol (IP) address of the first destination.

5. The method of claim 1, comprising:
   approving, by the processor of the networking device, the connection request from the source prior to the transmitting of the first security information to the source and the second security information to the first destination.

6. The method of claim 1, wherein the first security information comprises a private key, and the second security information comprises a public key different from the private key.

7. The method of claim 1, wherein the connection request from the source includes an events per second (EPS) information corresponding to network traffic at the source.

8. A non-transitory machine-readable storage medium storing instructions that when executed by a processing resource cause a networking device to:
- in response to a connection request from a source device, identify a first destination device from among multiple destination devices based on available bandwidths of the multiple destination devices;
- transmit a first security information to the source device and a second security information to the first destination device for authenticating a direct connection between the source device and the first destination device for a predetermined period of time, wherein the second security information transmitted to the first destination device includes an indication of the predetermined period of time;
- receive a signal indicating an activation of the predetermined period of time from the first destination device, wherein the signal indicating the activation of the predetermined period of time is sent to the networking device in response to an arrival of encrypted data from the source device at the first destination device;
- track the predetermined period of time in association with the first security information and the second security information in response to receiving the signal indicating the activation of the predetermined period of time; and
- limit the direct connection between the source device and the first destination device based on the tracking of the predetermined period of time.

9. The non-transitory machine-readable storage medium of claim 8, wherein the instructions to limit the direct connection between the source device and the first destination device comprise instructions that when executed by the processing resource cause the networking device to:
- transmit a stop signal to the source device and the first destination device in response to an expiration of the predetermined period of time, wherein the stop signal causes the source device to stop transmitting the encrypted data to the first destination device and causes the first destination device to stop receiving the encrypted data from the source device.

10. The non-transitory machine-readable storage medium of claim 8, comprising instructions that when executed by the processing resource cause the networking device to:
- responsive to the connection request from the source device, transmit a response to the source device including the first security information and an Internet Protocol (IP) address of the first destination device.

11. A networking device comprising:
- a processor; and
- a first memory storing instructions that when executed by the processor cause the processor to:
  - in response to a connection request from a source, identify a first destination from among multiple destinations based on available bandwidths of the multiple destinations;
  - transmit a first security information to the source and a second security information to the first destination for authorizing a direct connection between the source and the first destination for a predetermined period of time, wherein the second security information transmitted to the first destination includes an indication of the predetermined period of time;
  - receive a signal indicating an activation of the predetermined period of time from the first destination, wherein the signal indicating the activation of the predetermined period of time is sent to the networking device in response to an arrival of encrypted data from the source at the first destination;
  - track the predetermined period of time in association with the first security information and the second security information in response to receiving the signal indicating the activation of the predetermined period of time; and
  - limit the direct connection between the source and the first destination based on the tracking of the predetermined period of time.

12. The networking device of claim 11, comprising:
- a second memory storing instructions to handle the direct connection between the source and the first destination in response to the first memory being unavailable.

13. The method of claim 1, wherein the source comprises a source computing device, and the multiple destinations comprise multiple destination computing devices.

14. The method of claim 1, wherein the first security information transmitted to the source comprises a first key pair, and the second security information transmitted to the first destination comprises a second key pair,
- wherein the first key pair comprises a first public key and a first private key for encryption, and
- wherein the second key pair comprises a second public key and a second private key for decryption.

15. The non-transitory machine-readable storage medium of claim 8, wherein the connection request from the source device comprises information relating to an amount of network traffic to be transmitted by the source device, and
- wherein the instructions to identify the first destination device from among the multiple destination devices comprise instructions that when executed by the processing resource cause the networking device to:
- determine which of the multiple destination devices has sufficient available bandwidth for the amount of network traffic to be transmitted by the source device.

16. The networking device of claim 11, wherein the first security information comprises a private key for the source to encrypt data, and the second security information comprises a public key for the first destination to decrypt the encrypted data from the source.

17. The networking device of claim 11, wherein the first security information transmitted to the source comprises a first key pair, and the second security information transmitted to the first destination comprises a second key pair,
- wherein the first key pair comprises a first public key and a first private key for encryption, and
- wherein the second key pair comprises a second public key and a second private key for decryption.

\* \* \* \* \*